June 23, 1953

H. F. STRALEY 2,642,993

SCREEN FOR THRESHING MACHINES

Filed Aug. 7, 1950

INVENTOR.
Henry F. Straley
BY
ATTORNEYS

June 23, 1953  H. F. STRALEY  2,642,993
SCREEN FOR THRESHING MACHINES
Filed Aug. 7, 1950  2 Sheets-Sheet 2
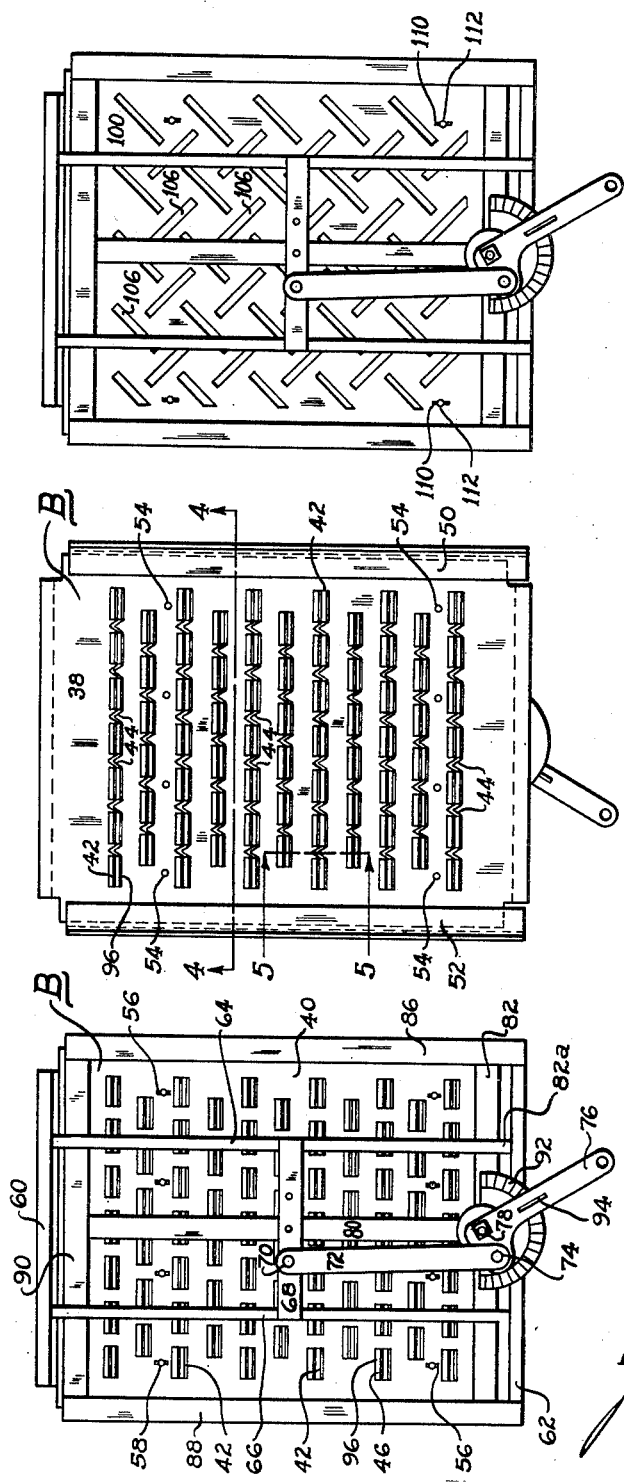
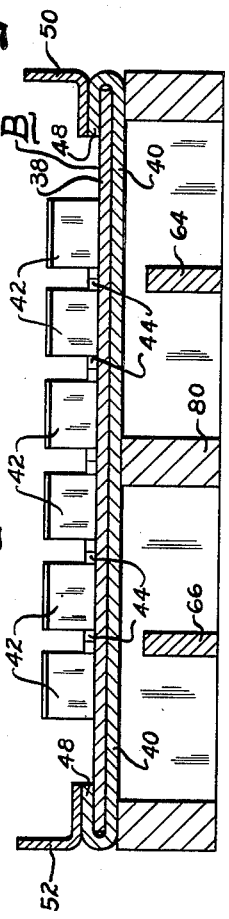
INVENTOR.
Henry F. Straley
BY
ATTORNEYS Patented June 23, 1953

2,642,993

UNITED STATES PATENT OFFICE 2,642,993

SCREEN FOR THRESHING MACHINES

Henry F. Straley, Riverton, Wyo.

Application August 7, 1950, Serial No. 178,039

3 Claims. (Cl. 209—398)

This invention relates to a threshing machine, harvester or other grain separating machine which is provided with a separator having a plurality of fixed or relatively fixed vanes in combination with means for adjusting the openings adjacent the vanes.

An object of the invention is to provide a machine of the kind described having a minimum of wearing parts, thus greatly reducing the number of parts of a device of this type where an adjustment is provided for handling different size grains.

The object of this invention is to provide a device wherein adjustment for different size grains may be affected without changing the flow of chaff regardless of the adjustment of the size of the openings.

A further object of the invention is to provide a device of the kind described in which the openings will automatically clean themselves of obstructions by actuation of the adjusting means.

Another object of the invention is to provide a device in accordance with the preceding paragraph wherein there are a plurality of openings located adjacent to the vanes, which openings are adjustable in size for handling different types of farm products.

A further object of the invention is to provide a device as set forth above wherein the size of the openings may be readily adjusted for different size grains or other products, such as seeds, etc.

An additional object of the invention is to provide a machine of the class described which has a number of vanes that are not adjustable in the ordinary sense, and which maintain their angle of inclination when handling different kinds of grains and other farm products which pass through such machines.

An additional object of the invention is to provide a machine of the type stated, for handling all kinds of grains, seeds, means and other similar farm products which readily separates the dirt and chaff from the whole beans or grains and which is not subject to clogging of the openings in its several positions of adjustment.

Another object of the invention is to greatly increase the proportion of sorted out grains, seeds, beans etc. from the chaff, dirt and other material which is to be discarded, and especially, to greatly reduce the amount of straw from the separated grains and other end products.

Yet another object of the invention is to provide a machine of the kind described, the separating means of which comprises a minimum number of parts which separating means combines the structure of a chaffer and a sieve.

Other objects will appear hereafter throughout the specification.

In the drawings,

Figure 2 is a top plan view of the preferred form of the screen of the machine.

Figure 3 is a bottom plan view of the structure shown in Figure 2.

Figure 4 is a transverse section through Figure 2 on the lines 4—4.

Figure 7 is a bottom plan view of the structure shown in Figure 6.

Figure 6:
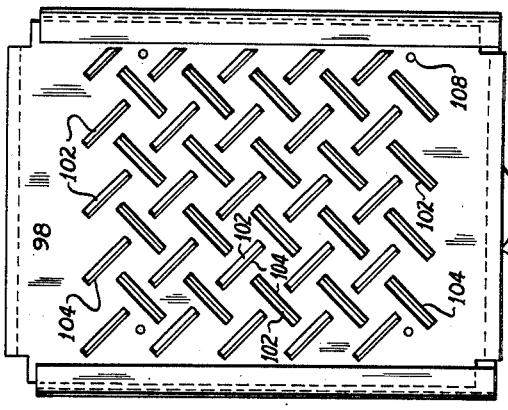
Figure 6 is a top plan view of a second form of the separator of the machine.

Various attempts have been made to provide a separating means in a harvester, combine or other machine which separating means may be adjusted to efficiently handle different types of grain, beans and other farm products of like kind. Such attempts have been generally only partially successful. One of the reasons for this is that it is necessary to provide machines of this type with a plurality of vanes and attempts have been made to adjust the openings adjacent to the vanes by adjusting the vanes. This adjustment results in greatly reducing the amount of separation, that is, large amounts of material find their way into the receptacle for the separated beans or grains. Another serious difficulty in such machines is that the adjustment of the plates or vanes effects the flow of chaff and such adjustment retards the flow of chaff when the vanes are adjusted to a higher or more nearly vertical position. Moreover, when adjustments are made the speed of flow of the material is always effected.

As distinguished from all such machines, the machine of the present invention does not affect the speed of the material, or retard the flow of chaff regardless of the amount of adjustment of the separator, and due to the fact that only two relatively moving parts are provided, there are not over about six wearing parts in the device of the present invention. The machines of the prior art, however, which are provided with adjusting mechanisms, have about 170 wearing parts, and these wearing parts continuously require repair and replacement. Because of the structure of the present machine, it will handle substantially twice the quantity of material to be separated than will machines of the same size now being used. Also, in the present invention, because the size of the openings are quite wide, especially in the second form of the invention, a minimum amount of dirt will get between the plates, due to the fact that the plates are spaced from each other a minimum distance and are held closely adjacent to each other during all positions of adjustment.

The letter A indicates the interior of a harvesting machine, threshing machine or a similar machine with parts broken away to the parts of the machine. This machine is provided with a frame 10 and a casing 12 forming an air passage 14 for the fan 16 in its circular casing 18. A grain auger 20 is mounted within the auger casing 22. A drive shaft 24 for driving the auger by sprockets is provided, the auger and drive shaft each being provided with sprockets over which drive chain 26 is trained. The drive shaft 24 also drives the endless conveyor belt 28.

Mounted within the machine is a grain board 30 which is pivotally supported and is connected with agitator mechanism that includes a lever arm 32 which when agitated will cause a rocking action of the grain board 30 on its pivot 34. The inclination and the agitation of this grain board will cause the grain straw to move longitudinally of the machine and cause the separation to take place due to the agitation of the grain board and the separator now to be described.

Figure 1:
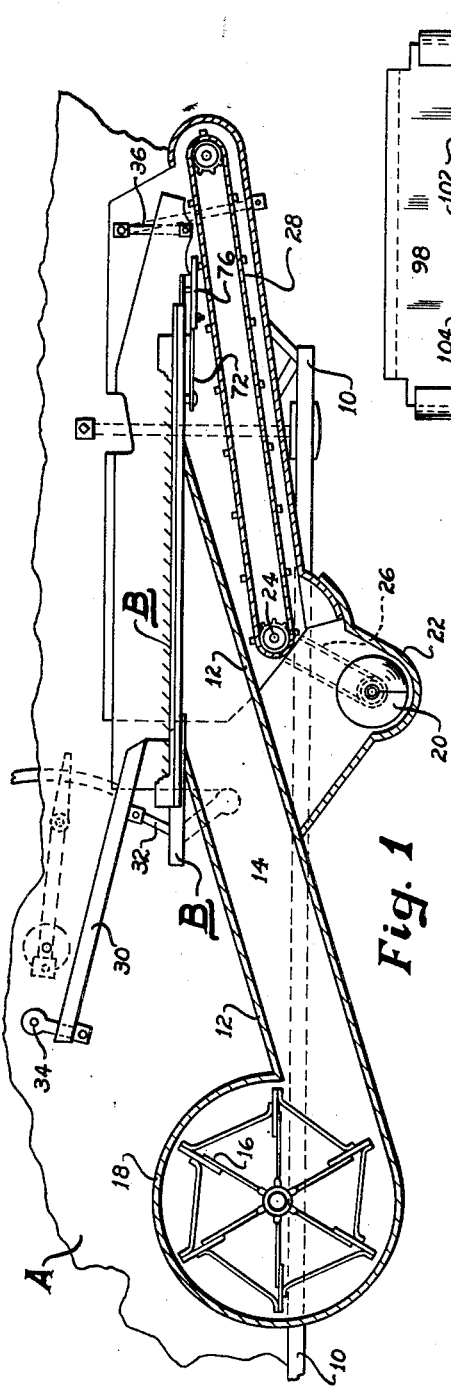
Figure 1 is a longitudinal vertical fragmentary section of the machine.

The lever arm 32 is connected, as seen in Figure 1 to the free end of the screen indicated generally at B. The riddle is supported by the shoe independently of the agitator while the rear end is supported by the arm 32. The arm is connected pivotally by the riddle to the connecting link 36.

It will be appreciated that the riddle may be agitated longitudinally, and the screen of the riddle is so positioned that air coming from the fan and its casing 12 will pass through the screen forcing the lighter material back over the rear end of the shoe.

The sieve as shown in Figures 2, 3 and 4, comprises the plates 38 and 40, the upper plate 38 being relatively stationary and the lower plate 40 being adjustable longitudinally of the first plate, by mechanism hereafter to be described.

Figure 5:
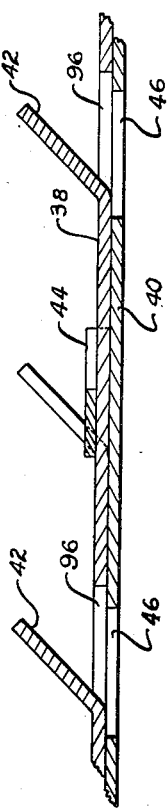
Figure 5 is a longitudinal section on the line 5—5 of Figure 2.

The upper plate is provided with rows of inclined vanes or fins 42. These vanes are arranged in rows so that the vanes of the rows are in echelon, or in offset arrangement as shown in Figure 2. Between each pair of vanes 42 is arranged a baffle 44 which has inclined sides and an apex pointing in a direction opposite to the direction of the flow of the material. The vanes 42 are preferably inclined at an angle of about 45° to the plate 38 toward the direction of flow of material on said sieve. They are set at this inclination but their setting may be varied 5° or 10° on either side of this degree of inclination by adjustment with a suitable tool. Behind and beneath each vane 42 is an opening 96. As shown in Figures 2 and 5, the apex of each baffle or deflector 44, is in substantially the same vertical plane as the base of the vanes and one side of the apertures therebeneath in the upper plate between which it is positioned. The ends of the inclined sides opposite to the apex are positioned immediately adjacent the opposite sides of the apertures, one end being directed toward one aperture and the other being directed toward the other aperture thereby providing a deflector of triangular shape, the base of said triangle being in the same vertical plane as the opposite sides of said openings in the upper plate between which the deflector is positioned. Due to this arrangement, the inclined sides direct material to their associated openings and due to the offset arrangement of the vanes, such a deflector arrangement is particularly advantageous for successful separation. The under plate 40 is provided with a series of openings 46 so spaced that during one position of adjustment the vanes will underly the openings 96. It will be appreciated that there is a vane for each opening and that the openings in one extreme position are entirely closed by the upper plate and in the opposite extreme, each vane opening overlies and is in alignment with an opening 46. In Figure 5 it will be seen that the vanes 42 are in the position where they overlie the openings which in this position are slightly out of alignment.

The plate 40 has turned over edges 48 serving to guide relative movement of the plates 38 and 40, and also to form a support upon which is mounted by welding or riveting the guides 50 and 52 which may conveniently consist of angle plates as shown in Figure 2. The contacting surfaces of the plates are held closely adjacent to each other by means of rivets 54 extending through holes in the upper plate 38 and which extend through slots 56 in the lower plate. These rivets are provided with lower heads 58. The upper plate has a frame work comprising transverse members 60 and 62 to which longitudinal members 64 and 66 are attached. There is a cross piece 68 connecting these last named members and to which is pivotally attached at 70 one end of the arm 72. The opposite end of arm 72 is pivotally attached at 74 to bell crank lever 76. This bell crank lever is provided with a pivot 78 which is connected to the longitudinal piece 82 forming part of the stationary frame work comprising frame pieces 82, 86, 88 and 90. A ratchet member 92 having teeth is engaged by a depressed notch 94 of the bell crank. The ratchet member is mounted on the stationary frame piece 82.

It will be seen that rotation of the bell crank 76 about its pivot 78 will move the arm 72 longitudinally of the screen and thereby cause the plate 40 to slide back and forth beneath plate 38 thereby adjusting the size of the openings formed by the openings 96 of the upper plate with regard to the openings 46 of the lower plate.

These openings 96 of the upper plate may be formed by striking up the vanes 42. In other words, the plate 38 may have struck up vanes 42 which form openings 96 of substantially the same size and shape of the struck up vanes 42.

In Figures 6 and 7, it will be noted that the two plates are designated by the numerals 98 and 100 and that the openings are indicated at 102. The openings are in front of the vanes in the top plate 98 which are indicated at 104 and the corresponding openings in the lower plate are indicated at 106. The two plates are connected to each other by rivets 108 which extend through holes in the plate 98 and into slots 110 in the lower plates. The rivets have lower heads 112 that prevent them from coming out of the slots, and which cause the plates to maintain a close sliding fit with each other, thus preventing the entrance of deleterious material between the plates.

The plates otherwise correspond to the structure of the preferred form shown in Figures 1 to 4 and accordingly, will not be described in detail hereinafter.

It will be noted, however, that the vanes 104 are preferably not as high as the vanes 42 of Figures 1 to 4 and that the diagonal arrangement of these openings forms a structure which is particularly advantageous in separating beans. When the beans are dropped upon the separator they slide across the face of the vanes to a convenient slot behind another vane and drop through this slot. The vanes or fins trip and turn the beans which when they get on edge, go through the slotted openings, which may be adjusted in size by adjustment of the ratchet device the same as shown in Figures 1 to 4. The machine shown in this form will eliminate 80% of the split beans and substantially all of the dirt. The cleaned bean goes to a suitable receptacle and is thus separated from the split bean and dirt.

It will be noted in the form shown in Figures 5 to 7 that an adjustment is made without affecting the inclination of the vanes. The plates 38 and 40 of Figures 1 to 4 and the plates 98 and 100 of Figures 5 to 7 may be constructed of sheet metal or any suitable material. The frame work of each form may be constructed of any suitable material but preferably is constructed of wood.

The form shown in Figures 2 to 4 is particularly adapted for all kinds of seeds, beans and grains. In other words, any material that is passed through a harvester or a similar machine, and the second form shown in Figures 5 to 7 is particularly adapted for separating split beans and dirt from the whole beans.

It will also be noted that the size of the openings in both forms of the invention, are such that very little or no straw or stems can get through the openings. Preferably, the vanes shown in the two forms of Figures 2 and 6 are of metal that may be bent by a suitable tool to change the inclination of the vanes.

In the devices of the prior art the straw blocks, the openings and, moreover, the adjustment effects the size or inclination of the vanes.

In order to clean the openings of the present machine, it is only necessary to operate the handle 76 several times so as to clear the openings.

The plates, if constructed of sheet steel, would preferably be made of hot rolled strips of about 16 to 22 gage. It will be noted that the bottom plate contains no deflectors but merely openings that may be aligned with the openings of the top plate and that the number of bars 64 and 66 will depend upon the size of the machine.

The foregoing description of the invention is explanatory thereof and various changes in the size, shape, and of the materials used, as well as in the details of the illustrated construction, may be made, within the scope of the appended claims, without departing from the spirit of the invention.

I claim:

1. A screen for use with threshing and other grain separating machines, comprising an upper plate and a lower plate, said upper plate having a plurality of vanes projecting upwardly at an acute angle, said upper plate having an opening beneath each vane and said lower plate having a plurality of openings, means for adjusting said lower plate with relation to said upper plate to regulate the alignment or disalignment of the said opening of said upper and lower plates, said vanes being arranged in said upper plate in transversely extending rows with the vanes in each row being offset from the vanes in a preceding row, and deflectors on the plate between each pair of openings in a row in said upper plate, each deflector including an apex pointing away from and having inclined sides for directing some of the material through said openings, the apex of each deflector being in substantially the same vertical plane as the base of the vanes and one side of the openings between which the deflector is positioned and the inclined sides forming with said apex a triangle with the base thereof being in substantially the same vertical plane as the opposite side of the said openings.

2. A screen for use with threshing and other grain separating machines, comprising an upper plate, said upper plate having a plurality of vanes projecting upwardly at an acute angle, said upper plate having an opening directly behind each vane, said vanes being arranged in said upper plate in transversely extending rows with the vanes in each row being offset from the vanes in a preceding row, and deflectors on the plate between each pair of openings in a row in said upper plate, each deflector including an apex pointing away from the opening and having inclined sides for directing some of the material through said openings.

3. The structure of claim 2 wherein the screen is provided with a lower plate beneath the upper plate, said lower plate having a plurality of openings and means for adjusting the lower plate with relation to the upper plate to regulate the alignment or disalignment of the openings of the upper and lower plates.

HENRY F. STRALEY.

References Cited in the file of this patent

UNITED STATES PATENTS

| Number | Name | Date |
|---|---|---|
| 627,640 | Fugate | June 27, 1899 |
| 668,737 | Loyd | Feb. 26, 1901 |
| 682,281 | Schill et al. | Sept. 10, 1901 |
| 693,447 | Sacora | Feb. 18, 1902 |
| 754,865 | Hasch | Mar. 15, 1904 |
| 759,068 | Black | May 3, 1904 |
| 1,116,167 | Thompson | Nov. 3, 1914 |
| 1,200,002 | McGraw | Oct. 3, 1916 |
| 1,339,560 | Hoffman | May 11, 1920 |
| 1,449,553 | Schlunke | Mar. 27, 1923 |
| 2,392,014 | Waite | Jan. 1, 1946 |